Figure 1:
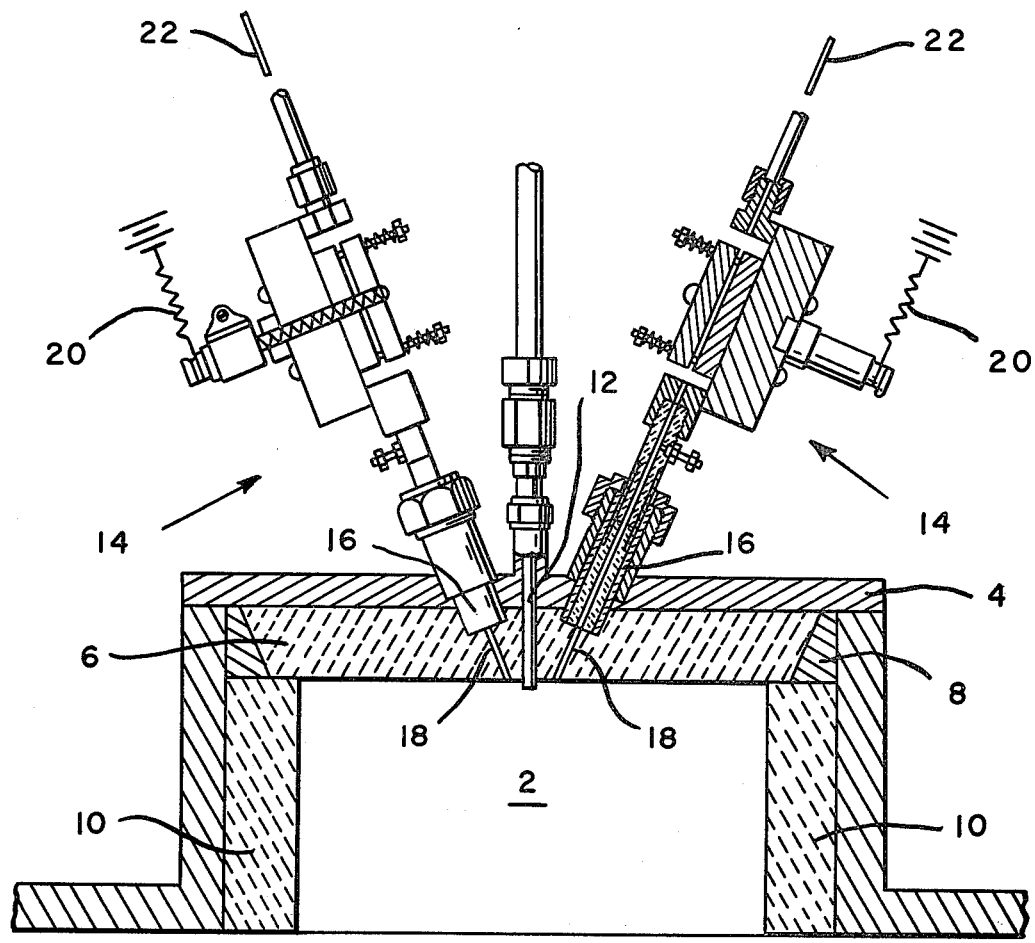

United States Patent [19]

Phipps

[11] 4,209,707
[45] Jun. 24, 1980

[54] WIRE GUIDE PLATE FOR PRODUCTION OF GASEOUS METAL HALIDES

[75] Inventor: Robert H. Phipps, Savannah, Ga.

[73] Assignee: American Cyanamid Company, Stamford, Conn.

[21] Appl. No.: 893,923

[22] Filed: Apr. 6, 1978

[51] Int. Cl.² .......................... B01K 1/00; C01F 7/56
[52] U.S. Cl. ................................. 250/544; 204/164;
  219/137.2; 250/542; 423/136
[58] Field of Search ................ 250/544, 542; 314/133;
  313/256, 259, 331–332, 333; 219/137.2, 72;
  204/164; 423/136; 106/300

[56] References Cited

U.S. PATENT DOCUMENTS

| | | | |
|---|---|---|---|
| 1,224,788 | 5/1917 | Reid | 250/544 |
| 3,734,761 | 5/1973 | Becker et al. | 423/613 |
| 3,873,842 | 3/1975 | Thackara | 250/544 |

Primary Examiner—Benjamin R. Padgett
Assistant Examiner—Deborah L. Kyle
Attorney, Agent, or Firm—Bruce F. Jacobs

[57] ABSTRACT

The use of a wire guide plate on an electrode-atomizer assembly used for preparing gaseous metal halides results in greatly increased consistency of operation and length of time between shut-downs of the equipment.

7 Claims, 1 Drawing Figure

WIRE GUIDE PLATE FOR PRODUCTION OF GASEOUS METAL HALIDES

This invention relates to an improvement in electrode-atomizer assemblies for the production of gaseous metal halides by utilizing a wire guide plate, preferably under compression, to increase the consistency of operation.

U.S. Pat. No. 3,873,842 of Thackara discloses an electrode-atomizer assembly having wire electrode guide means so designed that electrical contact with the wire electrodes is made outside the reaction chamber. While this represents an improvement in the art, utilization of such a device for a commercial operation has been difficult due to erratic operation in that the ceramic tips through which the wire electrodes are fed were found to break, clog up, and/or go out of alignment very quickly, primarily due to arcing back into the tips which melt the wire electrodes fed therethrough.

The present invention is directed to overcoming the above problems by the use of a wire guide plate, preferably ceramic and in compression, in contact with the cover plate and having apertures through which the wire electrodes are fed.

FIG. 1 is a vertical elevation, partly in section, of an electrode-atomizer assembly shown mounted on the cover plate of a reaction chamber, a fragmentary portion of which is shown in section, and the wire guide plate of this invention in contact with the cover plate and held in compression.

Referring to the drawing, the reaction chamber in which the vaporous metal halide is formed is indicated as 2 and has a cover plate 4 formed of a heat and corrosion resistant material such as, for example, Inconel metal (a nickel alloy containing at least about 60% nickel). Wire guide plate 6 is placed in intimate contact with the cover plate 4 and is preferably held in compression by tapered retainer 8, preferably made of a heat resistant metal. The wire guide plate 6 and tapered retainer 8 may be further held in place by ceramic insulating layers 10—10 and bolts, not shown.

The cover plate 4 and wire guide plate 6 are each provided with apertures to receive a halogen feed tube 12 and two electrode feed means 14—14. The halogen feed tube 12 is substantially perpendicular to the plane of the cover plate 4, while the electrode feed means 14—14 are each at an acute angle to the plane of the cover plate 4 such that the angle included between the electrode feed means 14—14 is less than 90° and preferably about 45°. The halogen feed tube 12 extends into the reaction chamber 2 and beyond the wire guide plate 6.

The electrode feed means 14—14 are each provided with gas seals 16—16, which are in the form of heat-resistant packing as, for example, polytetrafluoroethylene. The electrode feed means extend through the cover plate 4 and partially into the wire guide plate 6 with apertures 18 extending therefrom and into the reaction chamber for the electrodes to be fed therein. The electrode feed means having wire electrode contact means 20—20 may be as described in U.S. Pat. No. 3,873,842, incorporated herein by reference, with the exclusion of the ceramic tips.

The wire electrodes 22—22 comprise metal wires adapted to be continuously fed to the electrode-atomizer assembly hereinabove described from suitable supply rolls and wire straightening rolls of conventional construction (not shown). The electrodes are fed through the electrode feed means 14—14 having bores of a diameter only slightly greater than that of the wire electrodes whereby the latter are free to slide therethrough into the wire guide plate 6, apertures 18 and into the reaction chamber 2.

The operation of the improved electrode-atomizer assembly of this invention may be described briefly as follows: an inert gas, such as nitrogen, is fed into the electrode feed means so as to prevent leakage into the surrounding atmosphere of a halogen gas which is fed through tube 12 into the reaction chamber where it issues at a point substantially midway between the feed points of the two wire electrodes. The wire electrodes are fed continuously into the reaction chamber and are energized by electric current from an electric source. Due to the current carrying capability of the moving electrodes, an electric arc is formed and maintained within the reaction chamber at substantially the point of intersection of the wire electrodes. As a consequence, the electrodes are melted and simultaneously the molten metal is atomized by the gaseous halogen issuing from the halide feed tube whereby the gaseous halogen reacts with the atomized molten metal to produce a gaseous metal halide.

The wire guide plate 6 of the present invention may be prepared from non-metallic refractory materials which are stable at high temperatures, have a low apparent porosity, are high in dielectric properties, resistant to chemical attack, capable of being formed into complex shapes, and abrasion resistant. The apparent porosity is preferably less than about 25% and the electric resistivity is preferably greater than 1000 microohms. Suitable materials are ceramics such as, for example, alumina, silicon dioxide, zirconium oxide, zirconium silicate, magnesite, $Al_2O_3$-$SiO_2$ fireclays, etc.

The tapered retainer 8 is preferably prepared from a heat and corrosion resistant metal, such as Inconel or other high nickel alloy, and serves to force the wire guide plate into a state of compression to minimize the formation and/or propagation of any cracks which would otherwise form therein.

EXAMPLE 1

The electrode-atomizer assembly as described above having a 1¼ in. thick alumina wire guide plate held in compression by an Inconel tapered retainer was used to produce gaseous aluminum chloride as follows: aluminum metal wire electrodes were fed into the reaction chamber at a rate of 20 feet per minute and had a diameter of 0.1285 inches. Chlorine gas was fed into the reaction chamber at a rate of 35 standard cu. ft. per minute. Gaseous aluminum chloride was formed at a rate of about 3.1 lbs. per minute.

The reaction ran continuously for 10 days with slight variation in the operating rates.

EXAMPLE 2

The procedure of Example 1 was repeated using the following wire guide plate materials:
(a) Silicon dioxide
(b) Zirconium oxide Continuous operation for more than two days resulted in each case.

COMPARATIVE EXAMPLE

The procedure of Example 1 was repeated except that the wire guide plate and taper retainer of the present invention were replaced with the ceramic tips of U.S. Pat. No. 3,873,842. The feed rates were the same and gaseous aluminum chloride was produced, but the reaction had to be repeatedly halted after 30–45 minutes due to the ceramic tips breaking and/or being jammed up with the wire electrodes.

Of course, it should be understood that the present invention is useful in the production of metal halides other than gaseous aluminum chloride.

What is claimed is:

1. An improved consumable wire electrode-atomizer assembly for producing gaseous metal halides in a reaction chamber having a cover plate, two wire electrode feeding means in converging relationship extending through said cover plate and having sealing means therearound, a gas feed means for feeding an atomizing gas into said reaction chamber, located between said wire electrode feeding means and extending through said cover plate, a pair of wire electrode contact means each arranged to maintain continuous electrical contact with a consumable wire electrode which is fed through said wire electrode feeding means, to form an arc between the consumable electrodes in said reaction chamber in the presence of said atomizing gas, the improvement comprising a wire guide plate prepared from an insulating material positioned inwardly of the reaction chamber, abutting and substantially completely covering said cover plate and having an aperture through which said gas feed means extends into said reaction chamber, and having apertures into which said wire electrode feeding means are placed and terminates, and apertures contained therein at the terminal ends of said feeding means through which said consumable wire electrodes enter said reaction chamber.

2. The device of claim 1 wherein said wire guide plate is prepared from a non-metallic refractory material having an apparent porosity of less than about 25% and an electric resistivity of greater than about 1000 microohms.

3. The device of claim 1 wherein said wire guide plate is in compression.

4. The device of claim 3 wherein said compression is accomplished by means of a tapered metal retainer positioned around the periphery of said wire guide plate.

5. The device of claim 1 wherein said wire guide plate is prepared from alumina.

6. The device of claim 1 wherein said wire guide plate is prepared from silicon dioxide.

7. The device of claim 1 wherein said wire guide plate is prepared from zirconium oxide.

* * * * *